United States Patent Office 3,272,855
Patented Sept. 13, 1966

3,272,855
BIS-α-CYANO-β-SUBSTITUTED CINNAMIC ACID AMIDES AND ESTERS
Albert F. Strobel, Delmar, and Sigmund C. Catino, Castleton, N.Y., assignors to General Aniline & Film Corporation, New York, N.Y., a corporation of Delaware
No Drawing. Filed July 27, 1962, Ser. No. 213,002
The portion of the term of the patent subsequent to Dec. 18, 1979, has been disclaimed
14 Claims. (Cl. 260—465)

This invention relates to new and useful bis-α-cyano-β-substituted cinnamic acid compounds and to processes for preparing same, and, in particular to bis-esters and bis-amides of α-cyano-β-alkyl (or alkenyl) cinnamic acid compounds.

Various organic compounds exhibit the power to absorb electromagnetic radiations within the band of 2900 to 3700 A. and when incorporated in various plastic materials such as transparent sheets, the resultant sheet acts as a filter for all of the radiations passing through and will transmit only such radiations as are not absorbed by the sheet and/or the absorbing agent. It is thus possible to screen out undesirable radiations and utilize the resulting transparent sheet as a filter in many technical and commercial applications such as wrappings for food products and the like.

Numerous organic compounds have been suggested as absorbents for the range of radiations described above, which range is designated as the ultra-violet range. Such uses include incorporation in plastic sheet materials and the stabilization in general of transparent plastic bodies. By far, the greatest concern with respect to ultra-violet radiations is with those radiations which come from the sun. Most of these radiations have wave lengths between 250 and 400 millimicrons. The effects of such radiations on the human skin, producing sunburn and suntan, are of course well known. Other effects, however, of great commercial importance relates to the photochemical degradation caused by ultra-violet radiations. Many commercial products are either unstable when subjected to such radiations, or are affected to the extent that they become undesirable or unsalable. Many plastic materials, when exposed to this radiation, undergo substantial degradation resulting in the development of undesirable color bodies and subsequent loss of transparency. Food products, in addition to becoming discolored, often become unfit for human consumption. Thus, prolonged exposure of fruits, edible oils, butter and other prepared foods will spoil and turn rancid on exposure to ultra-violet light. It is well known that colored objects such as dyed textiles will fade on exposure to sunlight, and in particular to ultra-violet light. Many plastics, in addition to developing color formation and reduction in transparency, become brittle, lose their elasticity, crack and eventually completely deteriorate on exposure to sunlight. Paints, varnishes, lacquers and the like also are prone to these effects, even though here the transparency program may not be paramount.

We have discovered a class of compounds which are not only compatible with a great number of film-forming plastics, resins, gums, waxes and the like, but which, further, exhibit outstanding ultra-violet absorbing properties within the ultra-violet region close to the visible spectrum, namely, in the wave length region of 3000 to 3600 A. The compounds of this invention even though they exhibit outstanding absorbing properties close to the visible region of the electromagnetic field, nevertheless are essentially colorless compounds and can be employed with the assurance that they will not contribute to color in normally colorless formulations, nor will they affect the color of a colored formulation such as a paint film or a dyed textile.

It is therefore an object of the present invention to provide new and useful compounds characterized by outstanding ultra-violet absorbing properties.

It is a further object of this invention to provide new and useful bis-α-cyano-β-alkyl cinnamic acid esters.

It is another object of this invention to provide new and useful bis-α-cyano-β-alkenyl cinnamic acid esters.

It is still another object of the present invention to provide new and useful bis-α-cyano-β-alkyl cinnamic acid amides.

It is a still further object of the present invention to provide new and useful bis-α-cyano-β-alkenyl cinnamic acid amides.

It is still another object of the present invention to provide new and useful bis-α-cyano-β-alkyl for alkenyl cinnamic acid esters and amides exhibiting outstanding ultra-violet absorbing characteristics.

It is another object of the present invention to provide processes for the preparation of new and useful bis-α-cyano-β-alkyl (or alkenyl) cinnamic acid esters and amides.

Other objects and advantages will appear hereinafter as the description proceeds.

The new and useful compounds of this invention are characterized by the following general formula:

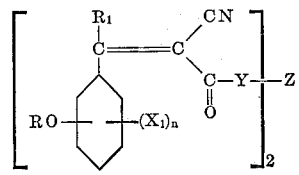

wherein $n$ may be 0 to 4; R may be hydrogen or any organic radical and preferably alkyl; $R_1$ is alkyl or alkenyl of 1 to about 30 carbon atoms; Y is oxygen (i.e. —O—) or nitrogen (i.e. $\overset{R_2}{\underset{N}{|}}$ —)

when Y is oxygen RO is one of the positions ortho or para to the ethylenic bond and when Y is nitrogen, RO may also be meta; $R_2$ is hydrogen or any organic radical with alkyl preferred; $X_1$ is any substituent which does not have an auxochromic effect and its bathochromism is less than 250 A. Since the utility of the subject compounds is dependent in the main upon a lack of color, any grouping or substituent which increases the wavelength of the peak absorption point more than 250 A. is to be avoided since this will shift such absorption into the visible region, that is, beginning at about 3600 to 4000 A. The groupings to be specifically avoided, therefore, as substitutents for $X_1$ are nitro (often classified as a chromophore but for the purposes of this categorization, auxochromic or bathochromic is definitely), oxy, i.e., —O—, and amino, i.e., —N—. All other groupings are satisfactory although some may have a bathcromic effect but nevertheless not as much as 250 A. Such substituents as suitable include:

halo (e.g., —C¹)

alkyl (e.g., —CH₃)

aryl 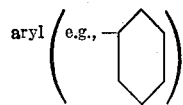

alkyl SO₂— (e.g., CH₃SO₂—)
carbalkoxy (e.g., —COOC₂H₅)

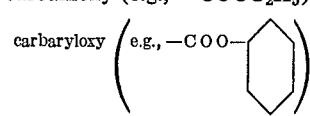

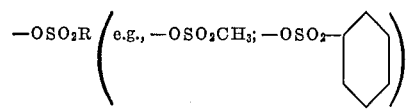

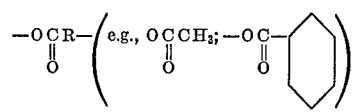

and Z is a bivalent bridge such as alkylene, substituted alkylene, arylene, substituted arylene or heterocyclic, for example: —CH₂CH₂—; —CH₂CH₂CH₂—;

—CH₂CH₂CH₂CH₂—    —CH₂CH₂CH₂CH₂CH₂—

(1) 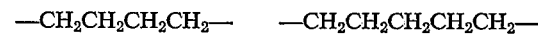

(2) 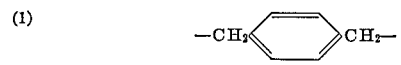

(3) 

(4) 

(5) 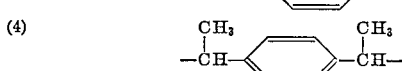

(6) 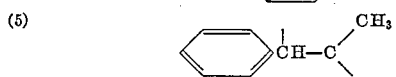

(7) 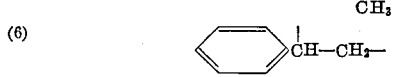

(8) 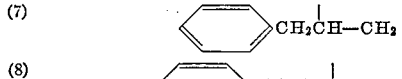

(9) 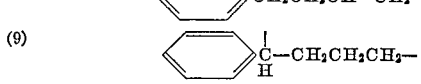

(10) 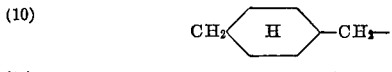

(11) 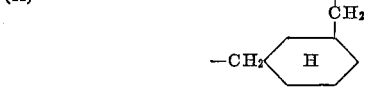

(12) 

(13) 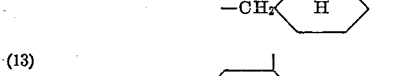

(14) 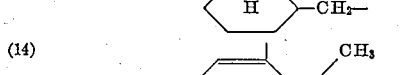

(15) 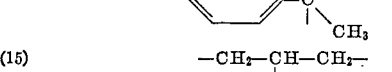

(16) 

(17)

(18)

(19)

(20)

(21)

(22)

As examples of specific R substituents, there may be employed:

alkyl
    methyl
    ethyl
    n-propyl
    iso-propyl
    n-butyl
    iso-butyl
    tertiary-butyl
    secondary-butyl
    n-amyl
    iso-amyl
    tertiary-amyl and the other isomeric amyls
    n-hexyl
    iso-hexyl and the other isomeric hexyls
    n-heptyl
    iso-heptyl and the other isomeric heptyls
    n-primary nonyl (nonyl-1)
        nonyl-(2)
        nonyl-(3)
        nonyl-(5)
    2-methyl-octyl-2
    4-ethyl-heptyl-4
    2-methyl-4-ethyl-hexyl-4
    n-primaryl octyl
        octyl-(2) (capyryl)
    2-methyl-3-ethyl-pentyl-3
    2,2,4-trimethyl-pentyl-4
    2-ethyl-hexyl-1
    3-ethyl-hexyl-3
    2-methyl-heptyl-2
    3-methyl-heptyl-3
    4-methyl-heptyl-4
    n-primary decyl (decyl-1)
    decyl-4 (secondary decyl)
    2-ethyl-octyl-3 (tertiary decyl)
    4-propyl-heptyl-4 (tertiary decyl)
    undecyl-1 (n-primary decyl)
    undecyl-2 (n-secondary decyl)
    dodecyl-1 (n-dodecyl)
    tridecyl-1 (n-tridecyl)
    tridecyl-7
    3-ethyl-undecyl
    tetradecyl-1 (n-tetradecyl)
    pentadecyl-1 (n-pentadecyl)

pentadecyl-8
hexadecyl (cetyl)
heptadecyl-9
octadecyl-1
2-methyl heptadecyl-2
eicosyl-1
docosyl-1
tricoscyl-12
tetracosyl
tricapyrl
pentacosyl
hexacosyl
heptacosyl
octacosyl
monacosyl
myricyl (30 carbons)
alkenyl
    allyl ($CH_2=CHCH_2-$)
    methallyl ($CH_2=C(CH_3)CH_2-$)
    crotyl ($CH_3CH=CHCHCH_2-$)
    butenyl-1 ($CH_2=CH-CH-CH_3$)
    pentenyl-1
    γ-isopropyl allyl
    β-ethyl-γ-propyl allyl
    2-methyl-octenyl-6
    decenyl-1
    decenyl-2
    undecenyl
    dodencenyl-2
    octadecenyl
    docosenyl
    pentamethyl eicosenyl
aryl
    phenyl
    tolyl
    xylyl
    cumyl
    α-naphthyl
    β-naphthyl
    α-anthraquinonyl
    β-anthraquinonyl
    γ-anthraquinonyl
    phenanthranyl
    diphenyl and the alkyl substituted derivatives thereof
Substituted alkyls, e.g.,
    cyanoathyl
    cyanopropyl(n)
    cyanoisopropyl
    cyanobutyl(h)
    cyanoisobutyl
    cyanoamyl(n)
    cyanoisoamyl
    cyanohexyl
    cyanoheptyl
    cyanononyl
    cyanodecyl
    cyanolauryl, and the like.
    hydroxyethyl
    hydroxypropyl (n-propyl, isopropyl)
    hydroxybutyl (n-butyl, isobutyl, etc.)
    hydroxyamyl
    hydroxyhexyl
    hydroxydecyl
    hydroxylauryl, and the like.
    chloroethyl
    chloropropyl (n-propyl, isopropyl)
    chlorobutyl (n-butyl, isobutyl, etc.)
    chloroamyl
    chlorohexyl
    chlorodecyl
    chlorolauryl, and the like.
    bromoethyl
    bromopropyl (n-propyl, isopropyl)
    bromobutyl (n-butyl, isobutyl, etc.)
    bromamyl
    bromohexyl
    bromodecyl
    bromolauryl, and the like.
    methoxyethyl
    methoxypropyl (n-propyl, isopropyl)
    methoxybutyl (n-butyl, isobutyl, etc.)
    methoxyamyl
    methoxyhexyl
    methoxydecyl
    methoxylauryl, and the like.
    ethoxyethyl
    ethoxypropyl (n-propyl, isopropyl)
    ethoxybutyl (n-butyl, isobutyl, etc.)
    ethoxyamyl
    ethoxyhexyl
    ethoxydecyl
    ethoxylauryl, and the like.
    corbomethoxy ethyl
    carbomethoxy propyl
    carbomethoxy butyl
    carbomethoxy amyl
    carbomethoxy hexyl, etc.
    carbethoxyethyl
    carbethoxypropyl
    carbethoxybutyl
    carbethoxyamyl
    carbethoxyhexyl, etc.
    carbopropoxyethyl
    carbopropoxypropyl
    carbopropoxybutyl
    carbopropoxyamyl
    carbopropoxyhexyl, etc.
    carbobutoxyethyl
    carbobutoxypropyl
    carbobutoxybutyl
    carbobutoxyamyl
    carbobutoxyhexyl, etc.
    phenoxymethyl
    phenoxyethyl
    phenoxypropyl
    phenoxybutyl
    phenoxyamyl
    phenoxyhexyl, etc.
    toloxymethyl
    toloxyethyl
    toloxypropyl
    toloxybutyl
    toloxyamyl
    toloxyhexyl, etc.
    xyloxymethyl
    xyloxyethyl
    xyloxypropyl
    xyloxybutyl
    xyloxamyl
    xyloxyhexyl, etc.
    hydroxyethoxyethyl
    hydroxyethoxypropyl
    hydroxyethoxybutyl
    hydroxyethoxyamyl, etc.
    hydroxypropoxyethyl
    hydroxypropoxypropyl
    hydroxypropoxybutyl
    hydroxypropoxyamyl, etc.
    hydroxybutoxyethyl
    hydroxybutoxypropyl
    hydroxybutoxybutyl
    hydroxybutoxyamyl, etc.
substituted aryl
    anisole
    phenetole
    p-diethoxyphenyl
    1-methoxy phenanthryl
    α-naphthylmethylether
    β-naphthylmethylether α-naphthylethylether
β-naphthylethylether
hydroxyethyl phenyl
hydroxypropyl phenyl
chlorophenyl
bromophenyl
1,2-dichlorophenyl
1,3-dichlorophenyl
1,3,5-trichlorophenyl
1,2-dibromophenyl
o-chlorotolyl
m-chlorotolyl
m-bromotolyl
bromo-o-xylyl
α,β-dichloro naphthyl
4-bromoacenaphthyl
carboxyphenyl
carboxytolyls
carboxyxylyls
carbalkoxylphenyls, e.g.,
    carbomethoxyphenyl
    carboethoxylphenyl
carbalkoxytolyls, e.g.,
    carbomethoxytolyls
acetophenyl
propiophenyl
butyrophenyl
lauroylphenyl
stearylphenyl
p-acetotolyl
o-acetotolyl
α-benzoyl naphthyl
β-benzoyl naphthyl
acetaminophenyl
acet-methylamino phenyl
o-acetoaminotolyl
p-acetoaminotolyl
α-acetoaminonaphthyl
β-acetoaminonaphthyl
propio-aminophenyl
butyro-aminophenyl
o-propioaminotolyl
p-propioaminotolyl
o-butyroaminotolyl
p-butyroaminotolyl
o-lauroylaminotolyl
p-lauroylaminotolyl
o-stearolylaminotolyl
p-stearolylaminotolyl
sulfamyl phenyl
sulfamyl naphthyl
substituted alkenyls
  2-chloroallyl
  3-chloroallyl
  3,3-dichloroallyl
  2,3-dichloroallyl
  2'-bromoallyl
  2-iodoallyl
  1-chlorobutenyl-(1)
  2-chlorobutenyl-(1)
  4-chlorobutenyl-(1)
  4-bromobutenyl-(1)
  2-chloro-4-bromobutenyl-(1)
  1,2-dichloro-4-bromobutenyl-(1)
  1,4-dibromobutenyl-(1)
  2,4-dibromobutenyl-(1)
  2-chlorcrotyl
  3-chlorcrotyl
  4-chlorcrotyl
  2,4-dichlorcrotyl
  1,2-bromocrotyl
  3-chloromethallyl
  3,3-dichloromethallyl
  1,2-dibromopentenyl-(1)
  2,3-dibromoheptenyl-(2)

$R_1$ may be any of the alkyl or alkenyl radicals of 1 to 30 carbon atoms described above as suitable for an R substituent.

$R_2$ substituents may be selected similarly as the R substituents.

In addition to the above contemplated derivatives, polyoxyalkylated derivatives thereof are within the purview of this invention. Any of the aforementioned derivatives containing at least one reactive hydrogen atom may be reacted with an alkylene oxide or a compound functioning as an oxide such as ethylene oxide, propylene oxide, butylene oxide, butylene dioxide, cyclohexane oxide, glycidol, epichlorohydrin, butadiene dioxide, isobutylene oxide, styrene oxide and mixtures thereof, and the like yield the corresponding polyoxyalkylated product. Among the types of compounds which are reactive in this manner are the following:

alcohols
    amides
    substituted amides
    and the like

From one to about 100 moles of oxyalkylating agent may be condensed with the said alcohols and amides.

In preparing the polyoxyalkylated derivatives of the above types, it is necessary to prevent interaction of the phenolic hydroxyl group of the phenone moiety from entering into this reaction. This may be accomplished by esterifying the said hydroxyl group with benzene sulfonyl chloride and then regenerating it by hydrolysis after the cyanocinnamate has been prepared.

Some specific ketones are:

2'-hydroxyacetophenone (2-hydroxyacetophenone)
4'-hydroxyacetophenone (4-hydroxyacetophenone)
4-methoxyacetophenone
4-ethoxyacetophenone
4-n-propoxyacetophenone
2'-alloxy-5'-bromoacetophenone
2-bromo-4'-methoxyacetophenone
2'-allyloxybutyrophenone
4'-butoxy-2'-methylbutyrophenone
3'-bromo-4'-methoxybutyrophenone
3'-chloro-4'-ethoxybutyrophenone
2',5'-dimethyl-4'-propoxybutyrophenone
4'-ethoxy-3'-methylbutyrophenone
4'-ethyl-2'-hydroxy-6'-methylbutyrophenone
2'-isopentyloxy-5'-methylbutyrophenone
2'-methyl-4'-propoxybutyrophenone
4'-methoxy-3'-phenlbutyrophenone
2'-hydroxy-5'-methyloctanophenone
4-N-dodecyloxyacetophenone
4-benzyloxyacetophenone
4'-phenoxyacetophenone
2',3'-dimethyl-4'-hydroxyacetophenone
3'-bromo-4'-hydroxyacetophenone
3'-bromo-5'-fluoro-2'-hydroxyacetophenone
3'-allyl-4'-hydroxyacetophenone
3'-allyl-2'-hydroxyacetophenone
3'-allyl-2'-hydroxy-5'-methylacetophenone
5'-ethyl-2'-hydroxybutyrophenone
4'-hydroxyoctanophenone
4'-hydroxyhexadecaphenone
5'-methyl-2'-(p-tolyloxy)acetophenone
4'-(p-hydroxyphenoxy)acetophenone
2'-hydroxy-4'-pentadecylacetophenone
2'-hydroxy-3'-methylacetophenone
2'-hydroxy-4'-methylacetophenone
2'-hydroxy-5'-methylacetophenone
3'-hydroxy-4',5'-dimethylacetophenone
3',5'-dibromo-4'-hydroxymethylbutyrophenone
2'-hydroxycrotonophenone
2'-hydroxycrotonophenone
4'-ethoxy-β-methylcrotononphenone
2'-hydroxypentenophenone 5′-chloro-2′-hydroxycrotonophenone
4′-methoxy-3-methyl-2-pentenophenone
4′-methoxy-2-hexenophenone
3′-tert.butyl-3′-chloro-2′-hydroxypentenophenone
2′-hydroxy-4′,5′-dimethylpentenophenone
2′-methoxy-4-heptenophenone
2′-methoxy-6-heptenophenone
2′-methoxy-2-octenophenone The general process for the preparation of the compounds of this invention involves a condensation of the selected ketone with a bis-cyanoacetic acid derivative under conditions to effect dehydration.

The usual procedure involves heating a mixture of the reactants in the presence of an acid catalyst at elevated temperatures until the reaction is substantially complete. A solvent is preferably employed to effect miscibility of the reactants and when such a solvent is used, the temperature of the reaction will usually be the reflux temperature of the solution of the ingredients. In the absence of a solvent, temperatures from about 75 to 150° C. may be used. The time of reaction will of course vary depending upon the specific reactants and the temperature used. In some instances a relatively low temperature for a short period of time effects the formatiton of a substantially quantitative yield of the desired compound. In other cases, longer times and higher temperatures are necessary to get the best yields. It is of course again obvious to one skilled in the art to ascertain for any given combination of reactants the most efficacious combination of temperature and time.

Upon completion of the reaction the desired product may be isolated by evaporation of the solvent and other volatiles followed by an aqueous wash.

The following examples will serve to illustrate the present invention without being deemed limitative thereof. Parts are by weight unless otherwise indicated.

EXAMPLE 1

*Preparation of*

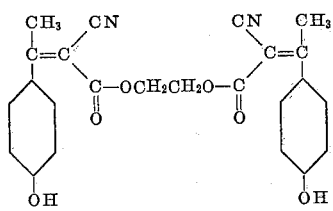

This compound is prepared by heating 0.5 mole of 4-hydroxyacetophenone with 0.25 mole of ethylene glycol di-(cyanoacetate) of the formula

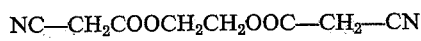

with 6.0 g. ammonium acetate, 20 cc. of glacial acetic acid and 250 cc. benzene at reflux with stirring for 12 hours. The benzene is distilled off and the residue is distilled with 200 ml. water and filtered.

EXAMPLE 2

The glyceryl-1-3-bis ester is prepared similarly as in Example 1 employing, however, glyceryl-1,3-bis-(α-cyanoacetate) in place of the ethylene glycol compound.

EXAMPLE 3

The following esters are prepared from the indicated bis(α-cyanoacetates) condensed with the indicated ketones as in Example 1:

| Bis(α-cyanoacetate) | Ketone |
|---|---|
| (a) 1,3-propylene glycol | 4-hydroxyacetophenone. |
| (b) 1,3-propylene glycol | 4-methoxyacetophenone. |
| (c) 1,3-propylene glycol | 4-n-dodecyloxyacetophenone. |
| (d) 1,3-propylene glycol | 2-hydroxyacetophenone. |
| (e) 1,3-propylene glycol | 4-phenylacetophenone. |
| (f) 1,3-propylene glycol | 4-benzylacetophenone. |
| (g) 1,3-propylene glycol | 4-hydroxy-3,5-dibromoacetophenone. |
| (h) 1,3-propylene glycol | 4′-methoxy-3′-methylacetophenone. |
| (i) 1,3-propylene glycol | 4′-hydroxy-octanophenone. |
| (j) 1,3-propylene glycol | 4′-ethoxy-3′-methylbutyrophenone. |
| (k) 1,3-propylene glycol | 3′-allyl-2′-hydroxyacetophenone. |
| (l) 1,3-propylene glycol | 4′-hydroxy-crotonophenone. |
| (m) 1,3-propylene glycol | 2′,3′-dimethyl-4′-hydroxyacetophenone. |

EXAMPLE 4

Examples 3a–m are repeated employing the following bis-α-cyanoacetates:

(a) 1,4-butanediol
(b) p-xylylene diol
(c) o-xylylene diol
(d) o-cyclohexylene diol

EXAMPLE 5

Examples 3a–m are repeated employing the following bis-cyanoacetyl diamides:

(a) bis-cyanoacetyl ethylene diamide
(b) bis-cyanoacetyl phenylene diamide
(c) bis-cyanoacetyl p-xylyene diamide
(d) bis-cyanoacetyl p-cyclohexylene diamide

EXAMPLE 6

Examples 3b–m are repeated employing the cyanoacetates of Examples 1 and 2.

EXAMPLE 7

The products of Examples 1 and 2 are incorporated separately into cellulose acetate film as follows:

0.375 g. of absorber product
35 g. ethanol
6.5 g. methyl cellosolve
9.0 g. ethyl acetate
26 g. cellulose acetate dope (3.75 g. cellulose acetate in 22 g. acetone)

are mixed with stirring until a clear solution is obtained. The material is cast to give a sheet ½ inch thick. A similar sheet is prepared without the absorber. The stabilizer containing films are much better protected as well as giving better protection to food material packaged therein.

EXAMPLE 8

The product of Example 3(c) is incorporated into polyethylene as follows:

0.5 gms. of above ultra-voliet absorber
9.5 gms. of polyethylene wax PT 95504 (Semet-Solvay)

are melted together at 120° C. to give a solution. The material is then pressed out in a Carver press to give a film of about 1/32 inch thickness. Meat stored behind the film containing absorber is less discolored on exposure to light than meat stored behind a similar film prepared as follows:

300 mls. of n-butylalcohol and 4.0 gms. of sodium hydroxide pellets are mixed. There is then added 13.6 gms. (=0.1 mole) of 4-hydroxyacetophenone. 44.2 gms. (=0.15 mole) of 1-iodo-n-dodecane is then added. The charge is stirred 15 hours at 68° C., cooled to room temperature, and diluted to 1 liter volume with methanol. There is added 0.6 gm. of sodium hydoxide bringing the material to pheolphthalein alkalinity. The material is filtered to give 4-n-dodecyloxy acetophenone.

EXAMPLE 9

The product of Example 3(d) is incorporated into a furniture polish as follows:

A melt is made on a steam bath of:

| | |
|---|---|
| Carnauba wax _____ oz__ | 9 |
| Turpentine _____ pts__ | 1.5 |
| Hot water containing 2 oz. soap _____ pts__ | 1.75 |

The whole mixture is beaten with a high speed stirrer. A similar formulation is made containing 5% of the weight of carnauba wax of the ultra-violet absorber above. The formulation containing the ultra-violet absorber when applied to stained and varnished oak gives better protection against discoloration (darkening) by light than the formulation free of absorber.

EXAMPLE 10

The product of the condensation of 4-hydroxyacetophenone with the bis-cyanodiamide of Example 5(a) is employed in Example 9. Similar results are obtained.

EXAMPLE 11

The products of Examples 3(e) and 3(m) are used in foamed polyurethane as follows:

A 5% solution of absorber in methyl Cellosolve is prepared. Into this solution is immersed a sponge made from a linear polyester (adipic acid-ethylene glycol) with a hydroxyl number of 45 and an acid number of 1 foamed with tolylene diisocyanate. The sponge is then removed, squeezed free of residual solvent, and vacuum oven dried. The impregnated material undergoes less yellowing on exposure to ultra-violet light than untreated material.

EXAMPLE 12

Application of absorbers to Epon resin using the following compounds:

| | | Ketone |
|---|---|---|
| (a) | 1,3-propylene glycol _____ | 4-benzylacetophenone. |
| (b) | 1,3-propylene glycol _____ | 4'-methoxy-3'-methylacetophenone. |
| (c) | 1,3-propylene glycol _____ | 4'-hydroxy-octanophenone. |
| (d) | Bis-cyanoacetyl ethylene diamide _ | 4-methoxyacetophenone. |

PROCEDURE

A mixture of 2 parts Epon 838, 1 part m-phenylene diamine and 5% of the weight of total polymer of the above ultra-violet absorber is prepared. The material is heat set in a mold at 120° C. for 24 hours. This product shows less color change on exposure to ultra-violet light than material set in the same manner without absorber.

EXAMPLE 13

The product used in Example 1 is treated with 10 moles of ethylene oxide in the presence of 1% by weight of KOH in an autoclave at 80° C. The resultant oxyethylated product contains an average of 10 oxyethyl groups and forms stable oil-in-water emulsions.

The amount of stabilizer to be incorporated is not particularly critical except that sufficient should be present to effect the desired degree of stabilization, and no more should be employed than is necessary to obtain this result. In general, between 0.1% and 10% based on the solids content of the organic material may be used, and preferably between about 0.5% to about 2%. As exemplified above, the ultra-violet absorbers employed with this invention can be used not only to stabilize clear films, plastics and the like, but they may be employed in opaque, semiopaque or translucent materials, the surface of which is susceptible to degration by ultra-violet light. Among such different types of materials, most of which have been exemplified, are foamed plastics, opaque films and coatings, opaque papers, translucent and opaque fibers, transparent and opaque colored plastics, fluorescent pigments, polishes, creams, lotions and the like whether opaque, clear, or translucent. The compounds employed in this invention give outstanding protection to paint, enamel and varnish films against fading of pigments and dyes contained therein.

Other variations in and modifications of the described processes which will be obvious to those skilled in the art can be made in this invention without departing from the scope or spirit thereof.

We claim:

1. A colorless compound of the formula:

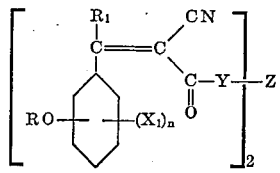

wherein:
R is selected from the group consisting of hydrogen alkyl, alkenyl, benzyl and phenyl radicals;
$R_1$ is selected from the group consisting of alkyl of 1 to about 30 carbon atoms and alkenyl of 3 to about 30 carbon atoms;
$X_1$ is a non-auxochrome having a bathochromism of less than 250 A;
n is an integer from 0 to 4;
Y is selected from the group consisting of —O— and —N—$R_2$;
$R_2$ is selected similarly as R and
Z is a bivalent radical, selected from the group consisting of lower alkylene, cyclohexylene, phenylene, and xylylene radicals.

2. A compound as defined in claim 1 wherein:
R is hydrogen
$R_1$ is alkyl and
Y is —O—.

3. A compound as defined in claim 1 wherein:
R is alkyl
$R_1$ is alkyl
Y is —O—

4. A compound as defined in claim 1 wherein
R is hydrogen
$R_1$ is alkyl and
Y is —NH—.

5. A compound as defined in claim 1 wherein
R is alkyl
$R_1$ is alkyl and
Y is —N-alkyl—.

6. A compound as defined in claim 1 wherein $X_1$ is alkyl.

7. A compound as defined in claim 1 wherein $X_1$ is halogen.

8. A compound of the formula:

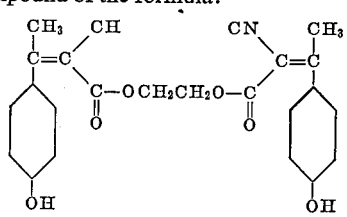

9. A compound of the formula:

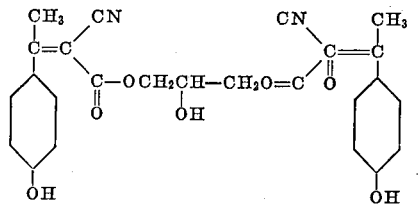

10. A compound of the formula:
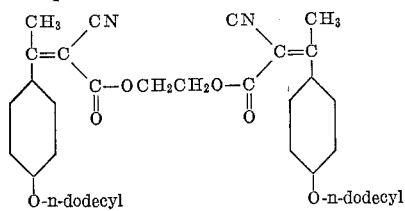
11. A compound of the formula:
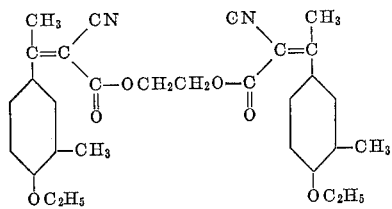
12. A compound of the formula:
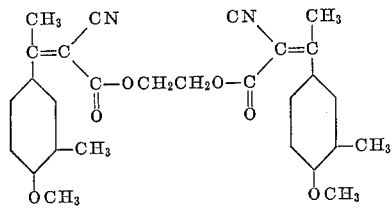
13. A compound of the formula:
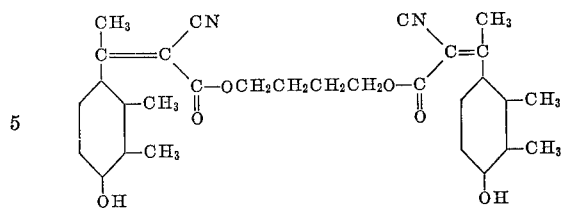
14. A compound of the formula:
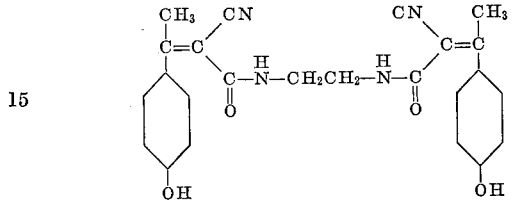
References Cited by the Examiner
UNITED STATES PATENTS
3,069,456   12/1962   Strobel et al. _____ 260—465
FOREIGN PATENTS
588,864   12/1959   Canada.
CHARLES B. PARKER, *Primary Examiner.*
DALE R. MAHANAND, *Assistant Examiner.*

UNITED STATES PATENT OFFICE
CERTIFICATE OF CORRECTION

Patent No. 3,272,855                      September 13, 1966

Albert F. Strobel et al.

It is hereby certified that error appears in the above numbered patent requiring correction and that the said Letters Patent should read as corrected below.

Column 2, line 59, for "definitely" read -- definitive --; column 5, line 15, for "monacosyl" read -- nonacosyl --; column 7, line 29, for "stearylphenyl" read -- stearoylphenyl --; column 8, line 15, for "the like yield" read -- the like to yield --; column 10, line 66, strike out "prepared as follows"; and insert instead -- prepared without absorber. The phenone starting compound may be prepared as follows --; column 12, lines 57 to 60, for the portion of the formula reading

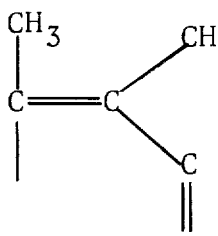      read      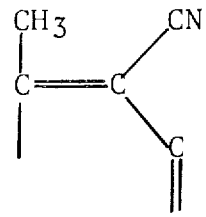

Signed and sealed this 22nd day of August 1967.

(SEAL)
Attest:

ERNEST W. SWIDER                      EDWARD J. BRENNER
Attesting Officer                    Commissioner of Patents